United States Patent
Olberg et al.

(10) Patent No.: US 11,472,678 B2
(45) Date of Patent: Oct. 18, 2022

(54) GANTRY SYSTEM AND METHOD

(71) Applicant: The Boeing Company, Chicago, IL (US)

(72) Inventors: Jeffrey H. Olberg, Federal Way, WA (US); Shane E. Arthur, Kirkland, WA (US); Matthew H. Mellin, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 269 days.

(21) Appl. No.: 16/902,815

(22) Filed: Jun. 16, 2020

(65) Prior Publication Data
US 2021/0387834 A1 Dec. 16, 2021

(51) Int. Cl.
| | |
|---|---|
| B66C 19/00 | (2006.01) |
| B66C 1/02 | (2006.01) |
| B25J 15/06 | (2006.01) |
| B64F 5/10 | (2017.01) |

(52) U.S. Cl.
CPC ......... B66C 19/005 (2013.01); B25J 15/0616 (2013.01); B66C 1/0243 (2013.01); *B64F 5/10* (2017.01)

(58) Field of Classification Search
CPC ....... B66C 19/005; B66C 1/0243; B25J 9/026
See application file for complete search history.

(56) References Cited

U.S. PATENT DOCUMENTS

| | | | | |
|---|---|---|---|---|
| 5,359,542 | A * | 10/1994 | Pahmeier | B25J 9/1615 356/621 |
| 6,098,260 | A * | 8/2000 | Sarh | B21J 15/10 227/52 |
| 9,950,909 | B1 * | 4/2018 | Kazemirad | B66C 1/20 |
| 2006/0090856 | A1 * | 5/2006 | Nelson | B29C 70/545 156/391 |
| 2006/0162140 | A1 * | 7/2006 | Frauen | B64F 5/10 228/49.1 |
| 2010/0304009 | A1 * | 12/2010 | Bausen | B05C 5/0216 118/695 |
| 2015/0375390 | A1 * | 12/2015 | Becroft | B05B 13/0431 901/41 |
| 2018/0169687 | A1 * | 6/2018 | Vasa | B05B 13/0278 |
| 2019/0002130 | A1 * | 1/2019 | Whitlaw | B25J 9/0036 |
| 2021/0061489 | A1 * | 3/2021 | Datas | B25B 5/145 |
| 2021/0171181 | A1 * | 6/2021 | Hirai | B25B 11/005 |

(Continued)

*Primary Examiner* — Kaitlin S Joerger
(74) *Attorney, Agent, or Firm* — Alleman Hall Creasman & Tuttle LLP

(57) ABSTRACT

A multi-axis gantry system comprising a multi-axis gantry apparatus and vacuum system, and method for repositioning is disclosed. The multi-axis gantry system comprises a frame. The frame includes a plurality of curved base members, a first rail, a second rail, a bridge slidably moveable along the first rail and the second rail, a carriage including an end effector, and a first plurality of pucks and a second plurality of pucks. The vacuum system comprises a vacuum controller, a first vacuum source and a second vacuum source. Each of the first and second vacuum sources is in fluid communication with one or more pucks of the first and second pluralities of pucks. The frame is reconfigurable from a first configuration mountable on a first work surface to a second configuration mountable on a second work surface that may be different from the first work surface.

20 Claims, 7 Drawing Sheets

(56) References Cited

U.S. PATENT DOCUMENTS

| | | | | |
|---|---|---|---|---|
| 2021/0261273 | A1* | 8/2021 | Johnston | E04G 3/28 |
| 2021/0387834 | A1* | 12/2021 | Olberg | B66C 13/06 |
| 2022/0033199 | A1* | 2/2022 | Secibovic | B66C 1/0243 |
| 2022/0152880 | A1* | 5/2022 | Jones | B29C 70/54 |

* cited by examiner

GANTRY SYSTEM AND METHOD

TECHNICAL FIELD

The present disclosure generally relates to a gantry system and apparatus, and in particular to a multi-axis gantry system and apparatus for industrial use.

BACKGROUND

End-effectors utilized in printing, or the like, on large bodies such as a fuselage of an airplane typically hang from or are part of relatively tall and large industrial gantry apparatus. Such gantry apparatus may be over thirty feet tall. When high print accuracy is required, work surfaces for existing industrial gantry apparatus are generally limited to broad, flat panel-like single curvature work zones. Furthermore, such existing gantry apparatus do not allow access to small surface print areas created by changes in elevation or surface features such as projections, attachments or the like, and typically do not allow printing access to non-horizontal surfaces. Moreover, existing gantry apparatus are not desirable when a high degree of print position accuracy is desired to avoid excess print overlap, for example at the borders of sections of a continuous design printed on a surface, especially a non-horizontal surface, having projections and attachments.

SUMMARY OF THE DISCLOSURE

In accordance with one aspect of the disclosure, a multi-axis gantry apparatus is disclosed. The apparatus comprises a frame in a first configuration for mounting to a first work surface. The frame comprising a first plurality of curved base members, a first rail and a second rail oriented parallel to the first rail, a bridge disposed between the first rail and the second rail, a carriage slidably moveable along the bridge, and a first plurality of pucks releasably coupled to the first rail and a second plurality of pucks releasably coupled to the second rail. Each of the first rail and second rail may be releasably coupled to the plurality of curved base members. The first rail includes a first plurality of vacuum attachment points and the second rail includes a second plurality of vacuum attachment points. Each vacuum attachment point in the first plurality and in the second plurality comprise an aperture pattern. The bridge is slidably moveable along the first rail and the second rail. The carriage is slidably moveable along the bridge. The carriage includes an end effector. The first plurality of pucks is releasably coupled to the first rail. A first puck of the first plurality of pucks is disposed on a first vacuum attachment point of the first plurality of vacuum attachment points and is repositionable to a second vacuum attachment point of the first plurality of vacuum attachment points on the first rail. A second plurality of pucks is releasably coupled to the second rail. A first puck in the second plurality of pucks is disposed on a first vacuum attachment point of the second plurality of vacuum attachment points and is repositionable to a second vacuum attachment point of the second plurality of vacuum attachment points on the second rail. The frame is reconfigurable to a second configuration mountable on a second work surface that is different from the first work surface. In the second configuration, the first puck in the first plurality of pucks is disposed on the second vacuum attachment point of the first rail.

In accordance with another aspect of the disclosure, a method for repositioning a frame of a multi-axis gantry system from a first work surface to a second work surface is disclosed. The multi-axis gantry system may include the frame and a vacuum system. The frame comprises a first plurality of curved base members, a first rail and a second rail oriented parallel to the first rail, a bridge disposed between the first rail and the second rail, a carriage slidably moveable along the bridge, a first plurality of pucks releasably coupled to the first rail, wherein a first puck of the first plurality of pucks is disposed on a first vacuum attachment point on the first rail, and a second plurality of pucks releasably coupled to the second rail, wherein a first puck in the second plurality of pucks is disposed on a first vacuum attachment point on the second rail. Each of the first rail and second rail may be releasably coupled to the plurality of curved base members. The first rail includes a first plurality of vacuum attachment points and the second rail includes a second plurality of vacuum attachment points, each vacuum attachment point comprising an aperture pattern. The bridge is slidably moveable along the first rail and the second rail. The carriage includes an end effector. The first puck is repositionable to a second vacuum attachment point on the first rail. The first puck in the second plurality of pucks is repositionable to a second vacuum attachment point on the second rail. The frame is reconfigurable to a second configuration that is mountable on a second work surface that is different from the first work surface. In the second configuration, the first puck in the first plurality of pucks is disposed on the second vacuum attachment point on the first rail. The vacuum system includes a vacuum controller, a first vacuum source and a second vacuum source. The vacuum controller is configured to activate or deactivate the generation of vacuum by the first vacuum source and the second vacuum source. The first vacuum source is in fluid communication with at least one puck of the first plurality of pucks and at least one puck of the second plurality of pucks. The second vacuum source is in fluid communication with at least one puck of the first plurality of pucks and at least one puck of the second plurality of pucks. The method may comprise ceasing, by the vacuum controller, vacuum supplied to the first plurality of pucks disposed on the first work surface and to the second plurality of pucks disposed on the first work surface until each puck in the first and second pluralities of pucks is releaseable from the first work surface, reconfiguring the frame from a first configuration to a second configuration, positioning the frame on a second work surface, and supplying, by the vacuum controller, vacuum to the first plurality of pucks disposed on the second work surface and to the second plurality of pucks disposed on the second work surface to secure each puck in the first and second pluralities of pucks to the second work surface.

In accordance with a further aspect of the disclosure, a multi-axis gantry system is disclosed. The multi-axis gantry system includes a frame in a first configuration for mounting to a first work surface, and a vacuum system. The frame comprising a first plurality of curved base members, a first rail and a second rail, a bridge disposed between and coupled to the first rail and the second rail, a carriage slidably moveable along the bridge, a first plurality of pucks releasably coupled to the first rail, and a second plurality of pucks releasably coupled to the second rail. The second rail is oriented parallel to the first rail. Each of the first rail and the second rail may be releasably coupled to the plurality of curved base members. The first rail includes a first plurality of vacuum attachment points and the second rail including a second plurality of vacuum attachment points, each vacuum attachment point in the first plurality and in the second plurality comprising an aperture pattern. The bridge is further disposed between the plurality of curved base members. The bridge is slidably moveable along the first rail and the second rail. The carriage includes an end effector. A first plurality of pucks is releasably coupled to the first rail, wherein a first puck of the first plurality of pucks is disposed on a first vacuum attachment point of the first plurality of vacuum attachment points and is repositionable to a second vacuum attachment point of the first plurality of vacuum attachment points on the first rail. Each puck in the first plurality of pucks includes a suction cup and a vacuum check valve. The suction cup is configured to receive the first work surface or a second work surface. The vacuum check valve is in fluid communication with the suction cup. The vacuum check valve is configured to capture data indicative of a vacuum level. A first puck in the second plurality of pucks is disposed on a first vacuum attachment point of the second plurality of vacuum attachment points and is repositionable to a second vacuum attachment point of the second plurality of vacuum attachment points on the second rail. Each puck in the second plurality of pucks includes a suction cup and a vacuum check valve in fluid communication with the suction cup. The vacuum check valve is configured to capture data indicative of a vacuum level. The frame is reconfigurable to a second configuration mountable on the second work surface that is different from the first work surface. In the second configuration, the first puck in the first plurality of pucks is disposed on the second vacuum attachment point of the first rail. The vacuum system comprises a vacuum controller, the first vacuum source and the second vacuum source. The vacuum controller is configured to activate or deactivate the generation of vacuum by a first vacuum source and a second vacuum source. The first vacuum source is in fluid communication with at least one puck of the first plurality of pucks and at least one puck of the second plurality of pucks. The second vacuum source is in fluid communication with at least one puck of the first plurality of pucks and at least one puck of the second plurality of pucks.

DETAILED DESCRIPTION

Figure 1:
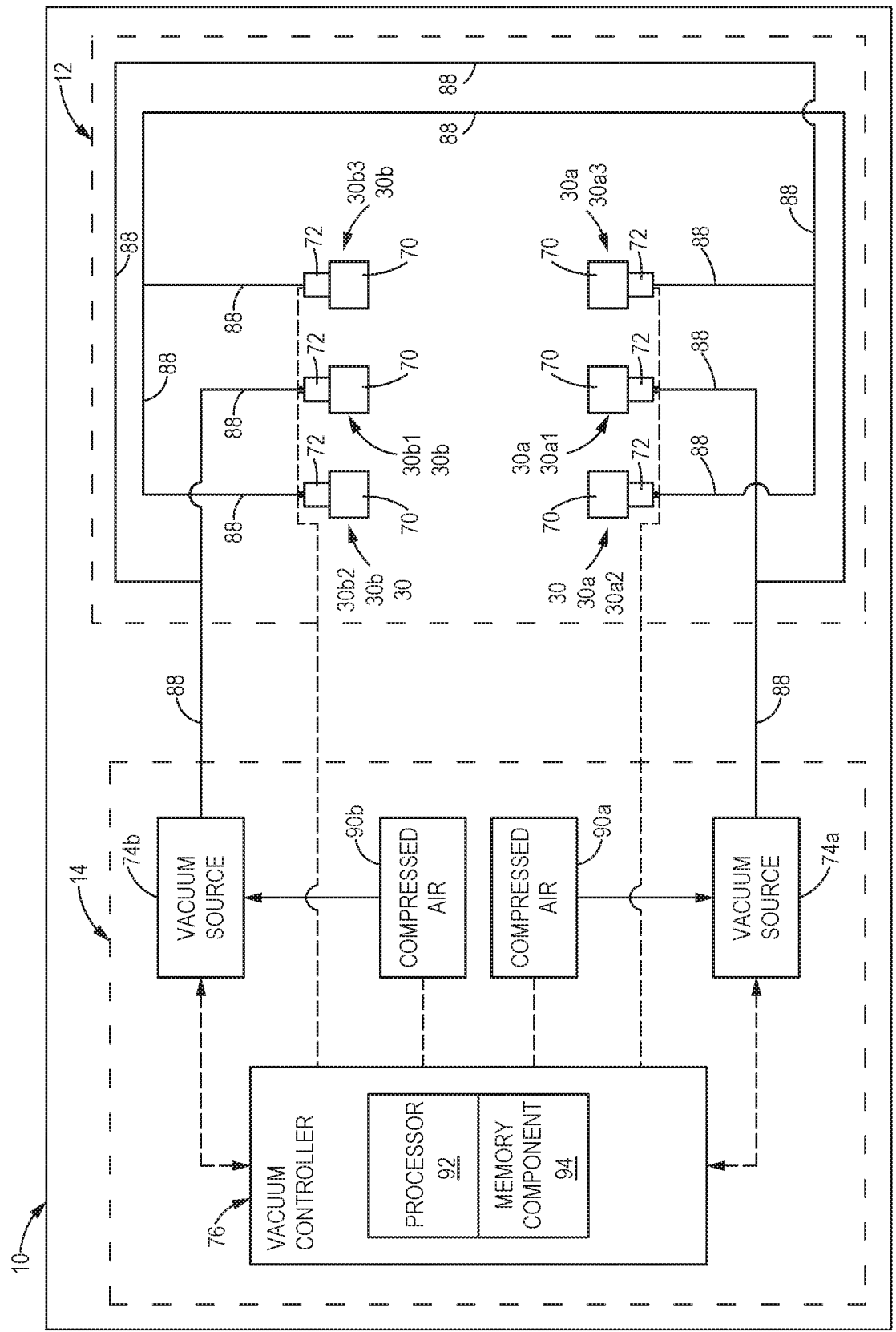
FIG. 1 depicts an example of a multi-axis gantry system.

FIG. 1 illustrates an example of a multi-axis gantry system 10. The multi-axis gantry system 10 comprises a multi-axis gantry apparatus 12 and a vacuum system 14.

Figure 2:
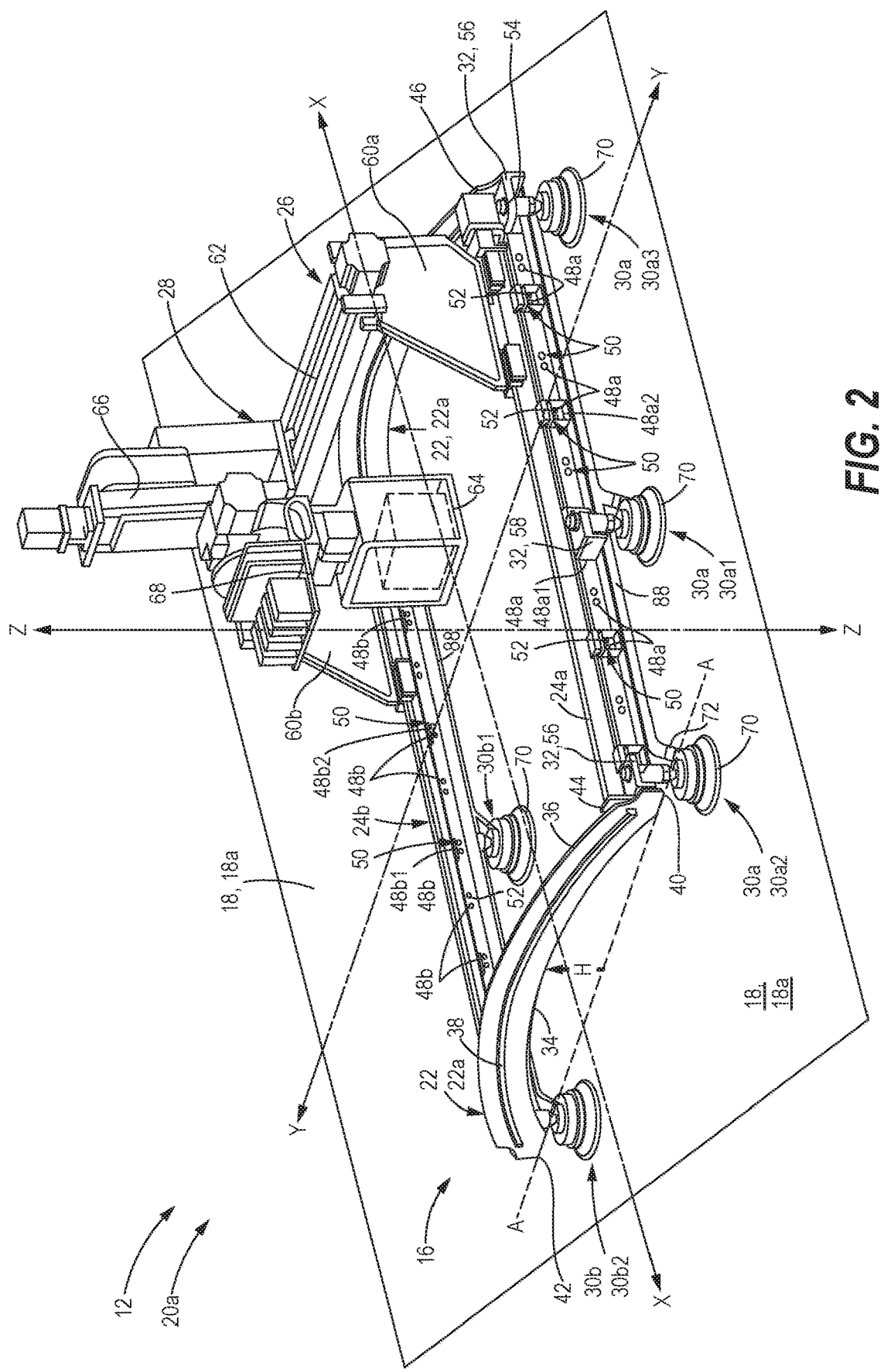
FIG. 2 depicts an example of a multi-axis gantry apparatus.
Figure 4:
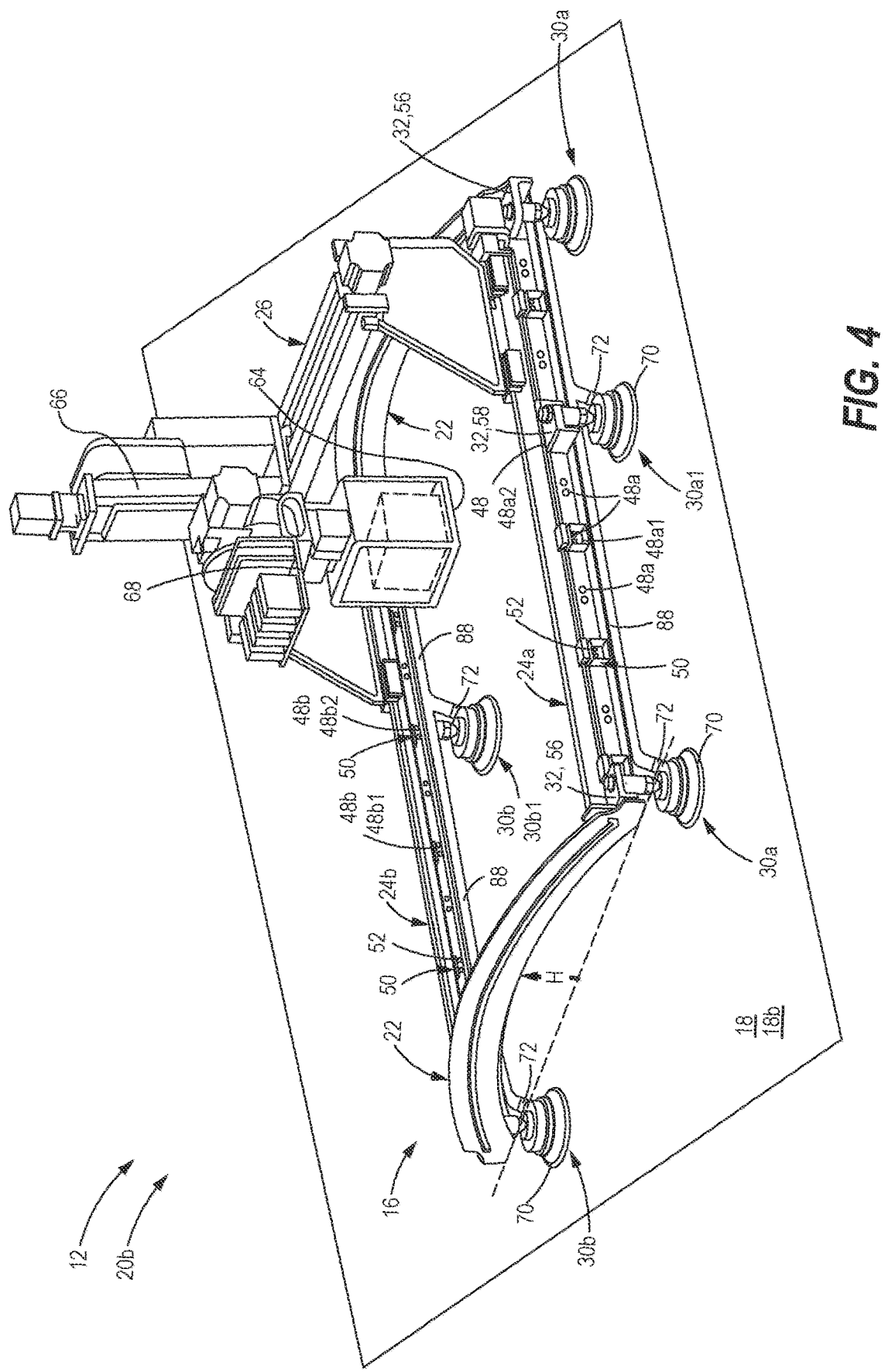
FIG. 4 illustrates another example of a multi-axis gantry apparatus.
Figure 5:
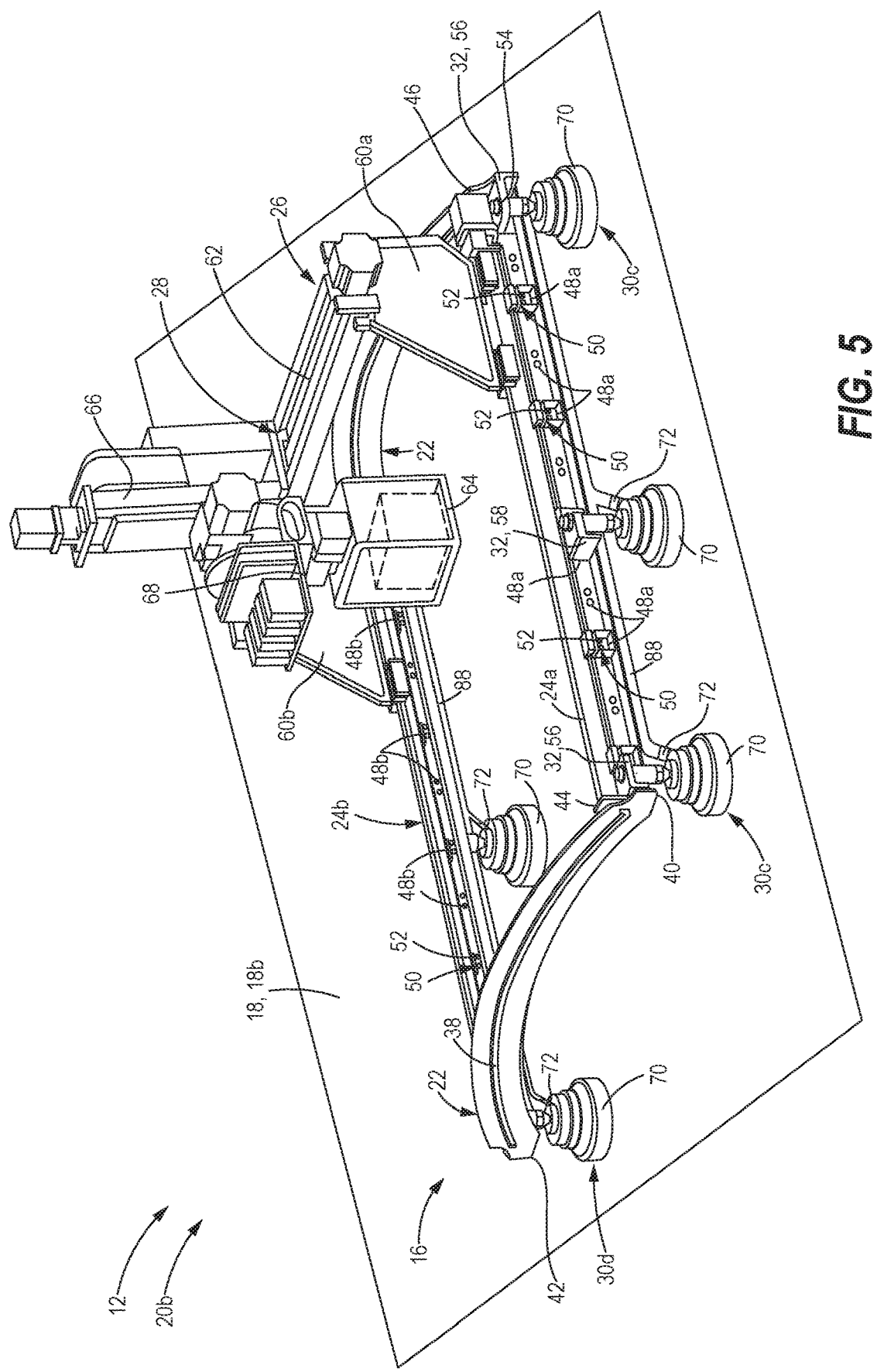
FIG. 5 illustrates another example of a multi-axis gantry apparatus.

Turning now to FIG. 2, an example of the multi-axis gantry apparatus 12 is shown. The multi-axis gantry apparatus 12 comprises a frame 16 configured to releasably mount to a work surface 18. The multi-axis gantry apparatus 12 is configured to be repositionable from a mounting on a first work surface 18a (as shown, for example, in FIG. 2) to a mounting on a second work surface 18b (as shown, for example, in FIGS. 3-5). Furthermore, the frame 16 is adapted to be reconfigurable from a first configuration 20a to a second configuration 20b (compare, for example, the exemplary first configuration 20a of FIG. 2 to the exemplary second configuration 20b of each of FIGS. 3-5).

As illustrated in FIG. 2, the frame 16 in the first configuration 20a may be mounted to a first work surface 18a. As illustrated by comparison to FIGS. 3-5, the frame 16 is reconfigurable to a second configuration 20b and mountable on a second work surface 18b. The second work surface 18b may be different from the first work surface 18a, for example, in size, general shape (e.g., flat, curved, etc.) and/or the presence or absence of features such as projections, attachments, changes in elevation, or the like.

Turning back to FIG. 2, the frame 16 comprises a plurality of curved base members 22, a first rail 24a and a second rail 24b, a bridge 26, a carriage 28, a first plurality of pucks 30a and a second plurality of pucks 30b. The frame 16 may further include a plurality of tabs 32.

Each of the plurality of curved base members 22 has an inner edge 34 and an outer edge 36. The inner edge 34 is the edge proximal to the work surface 18. The outer edge 36 is disposed radially outward of the inner edge 34. One or more of the curved base members 22 may include a reinforcing rib 38 or the like. Each of the curved base members 22 has a first end 40 and a second end 42. Each curved base member 22 has a curve profile. The curve profile is defined by the height H of the inner edge 34 as measured perpendicularly to the point on the inner edge 34 that is farthest from a plane A (that is parallel to the first rail 24a and the second rail 24b) and that extends between the first end 40 and the second end 42 of the curved base member 22. FIG. 2 illustrates an exemplary first plurality of curved base members 22, each of the plurality having a first curve profile.

Figure 3:
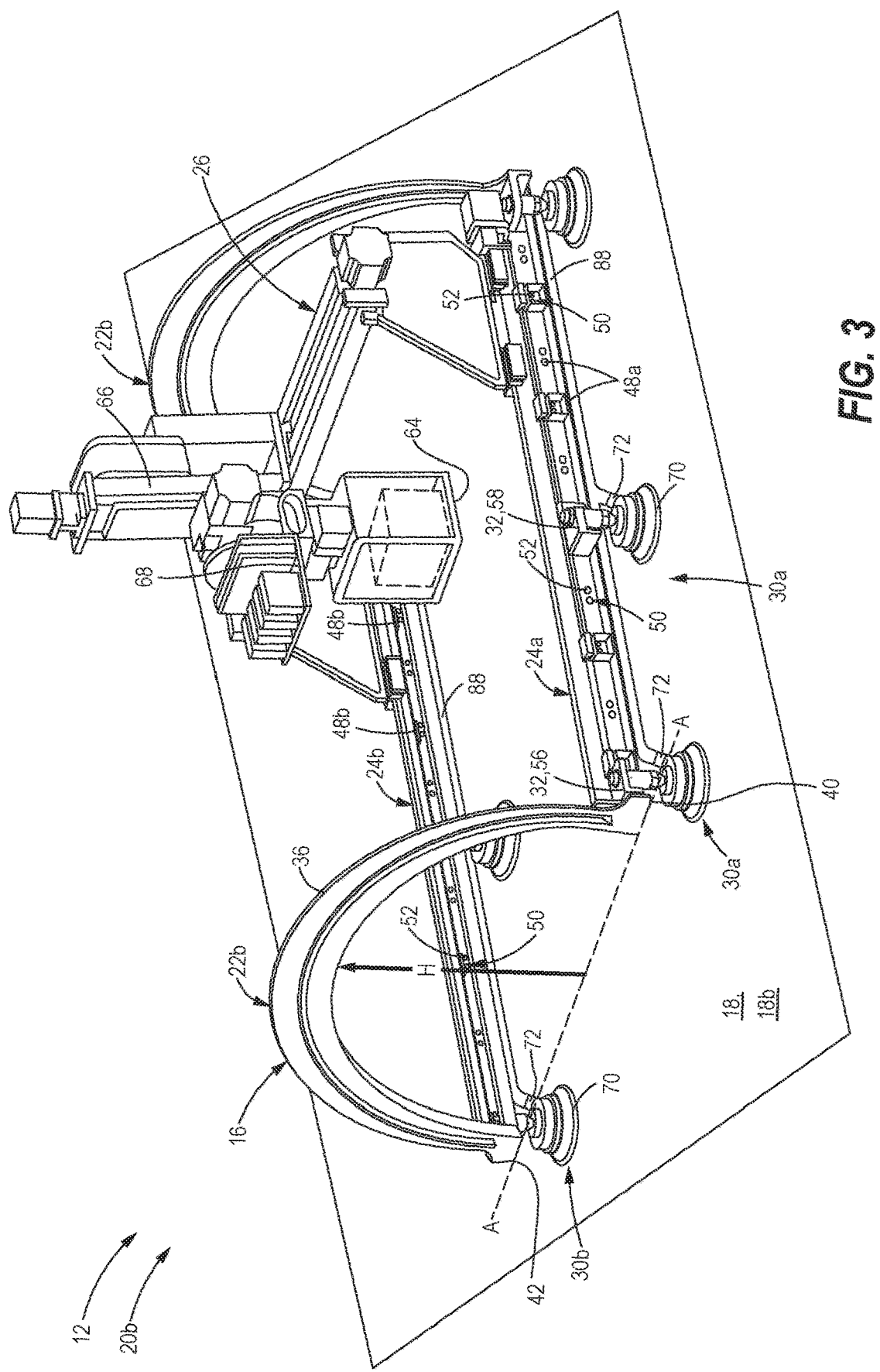
FIG. 3 illustrates another example of a multi-axis gantry apparatus.

FIG. 3 illustrates another example of a multi-axis gantry apparatus 12. In FIG. 3, the multi-axis gantry apparatus 12 is similar to that shown in FIG. 2. However, in the multi-axis gantry apparatus 12 of FIG. 3, the first plurality of curved based members 22a of FIG. 2 has been replaced with a second plurality of curved base members 22b that each have a second curve profile that is different than the first curve profile. While the distance between the first end 40 and the second end 42 of the curved base members 22b in FIG. 3 is the same as that in FIG. 2, the second curve profile is different than the first curve profile because the height H of the inner edge 34 of the second plurality of curved base members 22b of FIG. 3 is greater than the height H of the inner edge 34 of the first plurality of curved base members 22a of FIG. 2, thus making the second curve profile shown in FIG. 3 more parabolic in shape than the first curve profile illustrated in FIG. 2.

As shown in FIG. 2, the first rail 24a of the frame 16 is generally parallel to the second rail 24b. Both the first rail 24a and the second rail 24b are oriented to extend in a first direction, referred to herein as the X-axis. The first rail 24a has a front end 44 and a back end 46. The first rail 24a is releasably coupled to the plurality of curved base members 22 by fasteners configured to be engaged to secure the first rail 24a to a curved base member 22 and later disengaged so that the curved based member 22 may be removed from its coupling to the first rail 24a. Similarly, the second rail 24b is releasably coupled to the plurality of curved base members 22, by fasteners configured to be engaged to secure the second rail 24b to a curved base member 22 and later disengaged so that the curved based member 22 may be removed from its coupling to the second rail 24b.

The first rail 24a includes a first plurality of vacuum attachment points 48a and the second rail 24b includes a second plurality of vacuum attachment points 48b. Each vacuum attachment point 48a in the first plurality and each vacuum attachment point 48b in the second plurality includes an aperture pattern 50 that includes one or more apertures 52. In one example, each aperture pattern 50 on the first rail 24a and the second rail 24b may be the same (in other words a common aperture pattern 50).

A plurality of tabs 32 may be coupled to the frame 16. Each tab 32 may have a bore 54 therethrough. The bore 54 may be threaded or unthreaded. In one example, the plurality of tabs 32 may include end tabs 56. The end tabs 56 may be disposed adjacent to or may be mounted on the curved base members 22, or on the first rail 24a and/or second rail 24b. In the example shown in FIG. 2, the plurality of tabs 32 include a plurality of end tabs 56, each end tab 56 mounted on the curved base member 22 at a corner of the frame 16 where the curved based member 22 is joined to either the first rail 24a or to the second rail 24b.

In another example, the plurality of tabs 32 may include one or more adjustable tabs 58 that are configured to be repositionable on the first rail 24a or the second rail 24b to which they are releasably coupled.

As shown in the example of FIG. 2, an adjustable tab 58 is coupled to the first rail 24a at a first vacuum attachment point 48a1 (of the first plurality of vacuum attachment points 48a) and is configured to be slidably moveable along the first rail 24a (when released from the coupling) from the first vacuum attachment point 48a1 to a second vacuum attachment point 48a2 (of the first plurality of vacuum attachment points 48a) on the first rail 24a. Similarly, another adjustable tab 58 is coupled to the second rail 24b at a first vacuum attachment point 48b1 (of the second plurality of vacuum attachment points 48b) and is configured to be slidably moveable along the second rail 24b (when released from the coupling) from the first vacuum attachment point 48b1 to a second vacuum attachment point 48b2 (of the second plurality of vacuum attachment points 48b) on the second rail 24b. When coupled to the first rail 24a or the second rail 24b at the respective first vacuum attachment points 48a1, 48b1, the adjustable tab 58 may be secured to the respective first rail 24a or second rail 24b by a bolt(s), screw(s) (in one example, socket head cap screws), or the like, disposed through the one or more apertures 52 of the aperture pattern 50 of the respective vacuum attachment point 48a, 48b.

In yet another example, the plurality of tabs 32 may include end tabs 56 and adjustable tabs 58. In the example shown in FIG. 2, the frame 16 includes a plurality of tabs 32 that includes end tabs 56 and adjustable tabs 58. An adjustable tab 58 is disposed on the first rail 24a at a first vacuum attachment point 48a1 disposed between the end tabs 56. Another adjustable tab 58 (not shown) is disposed on the second rail 24b at a first vacuum attachment point 48b1 disposed between the end tabs 56 (not shown) on the second rail 24b.

The bridge 26 is disposed between the first rail 24a and the second rail 24b, and is disposed between the plurality of curved base members 22. The bridge 26 includes a first shoulder 60a, a second shoulder 60b, and a track 62 extending from the first shoulder 60a to the second shoulder 60b. The bridge 26 is slidably moveable along the first rail 24a and the second rail 24b (in the X-axis direction). More specifically, the first shoulder 60a is slidingly coupled to the first rail 24a and the second shoulder 60b is slidingly coupled to the second rail 24b.

The carriage 28 is slidably moveable along the track 62 of the bridge 26 in a second direction oriented along the Y-axis. The second direction is transverse to the first direction. The carriage 28 includes an end effector 64. The end effector 64 may be a print head configured to print on a work surface 18. Alternatively, the end effector 64 may be a laser, ultra-sonic knife, engraver, router or the like. The carriage 28 may further include a tower 66. The end effector 64 may be directly or indirectly slidingly coupled to the tower 66. The end effector 64 is slidably moveable along the tower 66 in a third direction oriented along the Z-axis. The third direction is transverse to the first direction and to the second direction.

The carriage 28 may further include a platform 68 coupled to the tower 66. The end effector 64 may be mounted to the platform 68. In the example shown in FIG. 2, the end effector 64 is coupled to the platform 68, which is slidingly coupled to the tower 66. Thus, the platform 68 (and the end effector 64 coupled to it) are slidingly moveable along the tower 66 in the third direction that is oriented along the Z-axis.

The first plurality of pucks 30a is releasably coupled to the first rail 24a. As shown in the example of FIG. 2, the first plurality of pucks 30a may include a first puck 30a1, a second puck 30a2 and a third puck 30a3, although in other examples there may be fewer or more than three pucks 30a. In the example of FIG. 2, the second puck 30a2 of the first plurality is disposed at the front end 44 of the first rail 24a, the third puck 30a3 of the first plurality is disposed at the back end 46 of the first rail 24a and the first puck 30a1 of the first plurality is disposed between the second puck 30a2 and the third puck 30a3 of the first plurality.

In an example, the first puck 30a1 of the first plurality of pucks 30a is disposed on a first vacuum attachment point 48a1 (of the first plurality of vacuum attachment points 48a) and is repositionable to a second vacuum attachment point 48a2 of the first plurality of vacuum attachment points 48a on the first rail 24a. More specifically, the first puck 30a1 may be releasably coupled to a first adjustable tab 58 that is releasably coupled to the first rail 24a via an aperture pattern 50 at the first vacuum attachment point 48a1. Such first puck 30a1 may be repositioned to a second vacuum attachment point 48a2 on the first rail 24a by decoupling or disengaging the first adjustable tab 58 from the aperture pattern 50 of the first vacuum attachment point 48a1 and sliding the adjustable tab 58 (and the first puck 30a1) to the second vacuum attachment point 48a2 and releasably coupling the adjustable tab 58 to the second vacuum attachment point 48a2 (via the aperature pattern 50 disposed at the second vacuum attachment point 48a2) on the first rail 24a.

Each of the first plurality of pucks 30a includes a suction cup 70 configured to receive in suction-engagement the work surface 18 on which it is disposed. Each of the first plurality of pucks 30a may further include a vacuum check valve 72 valve in fluid communication with the suction cup 70. The vacuum check valve 72 may be disposed adjacent to the suction cup 70. As shown in FIG. 1, the vacuum check valve 72 is disposed between the suction cup 70 and a first vacuum source 74a. The vacuum check valve 72 is configured to capture data indicative of the vacuum (level) in the suction cup 70 of the puck 30a. In an example, the vacuum check valve 72 may be configured to capture such data and provide or transmit such data indicative of the vacuum (level) to the vacuum controller 76. Typically, the vacuum check valve 72 is configured to allow air to flow in only one direction. In one example, once the desired vacuum level is reached for a suction cup 70 of the puck 30a, the vacuum check valve 72 may be closed by the vacuum controller 76 to maintain the vacuum level in the puck 30a.

Similarly, the second plurality of pucks 30b is releasably coupled to the second rail 24b (see FIG. 2). As best shown in the example of FIG. 1, the second plurality of pucks 30b includes a first puck 30b1, a second puck 30b2 and a third puck 30b3, although in other examples there may be fewer or more than three pucks 30b. In the example of FIG. 2, the second puck 30b2 is disposed at the front end 44 of the second rail 24b, the third puck 30b3 is disposed as the back end 46 of the second rail 24b and the first puck 30b1 is disposed between the second puck 30b2 and the third puck 30b3 of the second plurality of pucks 30b.

In an example, the first puck 30b1 of the second plurality of pucks 30b is disposed on a first vacuum attachment point 48b1 (of the second plurality of vacuum attachment points 48b) and is repositionable to a second vacuum attachment point 48b2 of the second plurality of vacuum attachment points 48b on the second rail 24b. More specifically, the first puck 30b1 may be releasably coupled to a first adjustable tab 58 that is releasably coupled to the second rail 24b via an aperture pattern 50 at the first vacuum attachment point 48b1 on the second rail 24b. Such first puck 30b1 may be repositioned to a second vacuum attachment point 48b2 on the second rail 24b by decoupling or disengaging the first adjustable tab 58 from the aperture pattern 50 of the first vacuum attachment point 48b1 and sliding the adjustable tab 58 (and the first puck 30b1) to the second vacuum attachment point 48b2 on the second rail 24b and releasably coupling the adjustable tab 58 to the second vacuum attachment point 48b2 (via the aperture pattern 50 disposed at the second vacuum attachment point 48b2) on the second rail 24b. Each of the second plurality of pucks 30b includes a suction cup 70 configured to receive in suction-engagement the work surface 18 on which it is disposed.

Like the first plurality of pucks 30a, each of the second plurality of pucks 30b may further include a vacuum check valve 72 in fluid communication with the suction cup 70 (best seen in FIG. 1). The vacuum check valve 72 may be disposed adjacent to the suction cup 70. Similar to that discussed above with regard to vacuum check valves 72 of the first plurality of pucks 30a, each vacuum check valve 72 of the second plurality of pucks 30b is disposed between the suction cup 70 and a second vacuum source 74b, and each vacuum check valve 72 is configured to capture data indicative of the vacuum (level) in the suction cup 70 of the puck 30b. In an example, the vacuum check valves 72 (of the second plurality of pucks 30b) may be configured to capture such data and provide or transmit such data indicative of the vacuum (level) to the vacuum controller 76. Typically, the vacuum check valve 72 is configured to allow air to flow in only one direction. In an example, once the desired vacuum level is reached for a suction cup 70 of a puck 30b in the second plurality, the vacuum check valve 72 associated with that puck 30b may be closed by the vacuum controller 76 to maintain the vacuum level in that puck 30b.

Each puck 30a, 30b has a puck profile. The puck profile may include one or more of the following: height, width, suction cross-sectional area at the work surface 18, or suction cup shape (see FIGS. 2-5).

Figure 6:
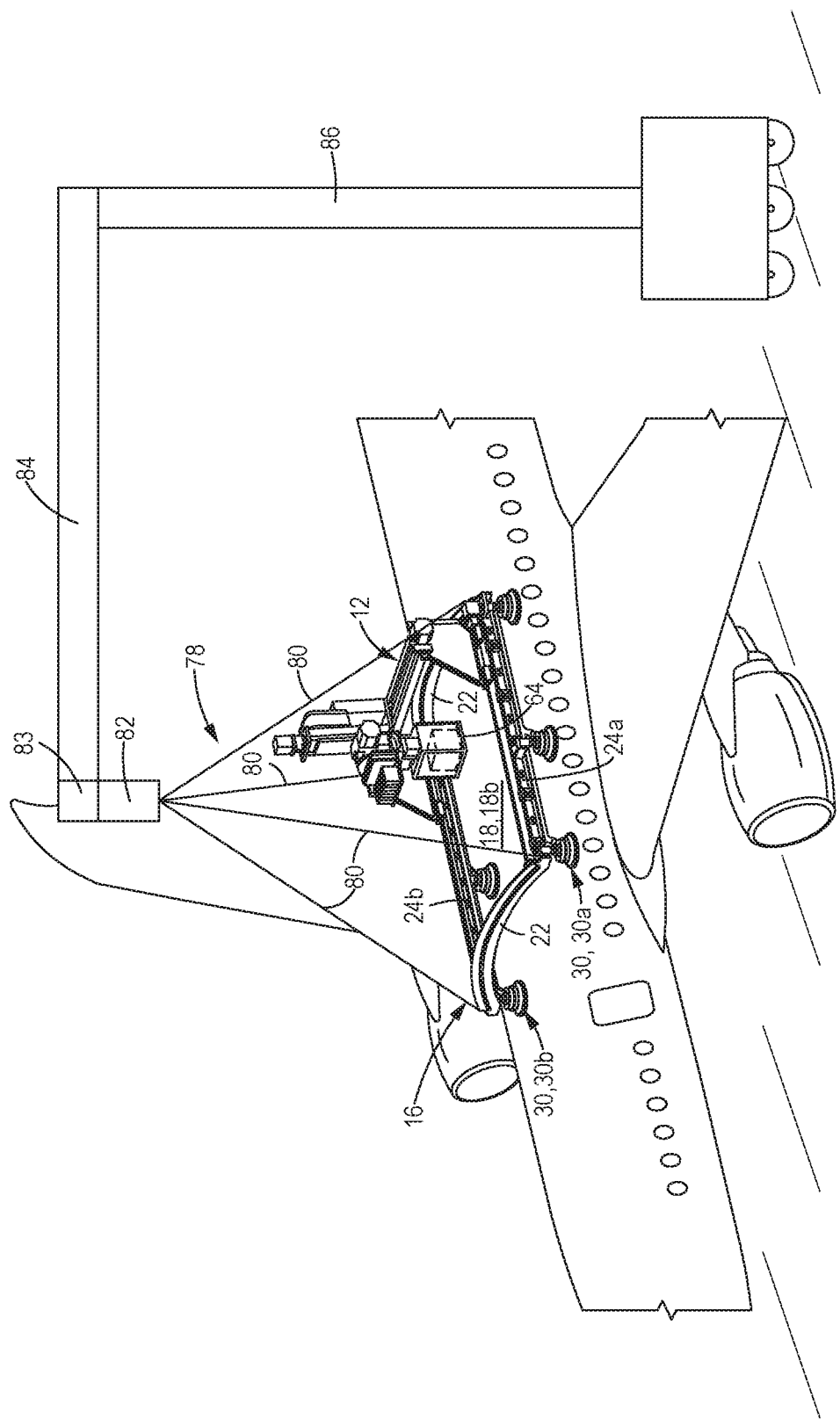
FIG. 6 illustrates an example of the multi-axis gantry apparatus including a lanyard.

Turning now to FIG. 6, the multi-axis gantry apparatus 12 may further include a lanyard 78, or the like. In one example, the lanyard 78 may comprise a plurality of members 80, each member 80 coupled to the frame 16 (for example a corner of the frame 16) and coupled together at a joint 82. The joint 82 may be coupled to a quick-release coupling 83 or the like. As can be seen in FIG. 6, the lanyard 78 may be coupled to a robotic arm 84 or the like disposed on top of a lift 86 adapted to assist with supporting the weight of the multi-axis gantry apparatus 12 and to assist with positioning the multi-axis gantry apparatus 12 on a work surface 18 (for example, the fuselage or body of an airplane). The lanyard 78 together with the robotic arm 84 and lift 86 hold the frame 16 in place in the event that vacuum is accidentally released from one or more pucks 30a, 30b or a vacuum source 74a, 74b malfunctions, and also may help support the multi-axis gantry apparatus 12 during positioning/repositioning on a work surface 18 or reconfiguring of the multi-axis gantry apparatus 12.

Turning back to FIG. 1, the vacuum system 14 comprises a vacuum controller 76, a first vacuum source 74a in communication with the vacuum controller 76 and a second vacuum source 74b in communication with the vacuum controller 76.

The first vacuum source 74a and the second vacuum source 74b are each configured to generate vacuum. In an example, each of the first vacuum source 74a and the second vacuum source 74b may be a vacuum ejector that generates vacuum utilizing a flow of inbound compressed air from a compressed air source 90a, 90b (to the vacuum ejector) and the Venturi principle, as is known in the art. Other appropriate sources of vacuum generation may be utilized.

The first vacuum source 74a is in fluid communication with one or more pucks 30a of the first plurality of pucks 30a and one or more pucks 30b of the second plurality of pucks 30b. More specifically for each puck 30a, 30b (of the first plurality and second plurality) for which the first vacuum source 74a generates a vacuum, the first vacuum source 74a is in fluid communication with that puck 30a, 30b via the vacuum check valve 72 associated with (fluidly connected to) that puck 30a, 30b. The first vacuum source 74a is in fluid communication with such vacuum check valve 72 via conduit 88 extending between the first vacuum source 74a and the vacuum check valve 72.

The second vacuum source 74b is in fluid communication with one or more pucks 30a of the first plurality of pucks 30a and one or more pucks 30b of the second plurality of pucks 30b. More specifically, for each puck 30a, 30b for which the second vacuum source 74b generates a vacuum, the second vacuum source 74b is in fluid communication with that puck 30a, 30b via the vacuum check valve 72 associated with (fluidly connected to) that puck 30a, 30b. The second vacuum source 74b is in fluid communication with such vacuum check valve 72 via conduit 88 extending between the vacuum source 74b and the vacuum check valve 72.

The vacuum controller 76 is configured to activate the generation of vacuum by the first vacuum source 74a to supply vacuum to those pucks 30 of the first and second pluralities of pucks 30a, 30b that the first vacuum source 74a is in fluid communication with. The vacuum controller 76 is configured to activate the generation of vacuum by the second vacuum source 74b to supply vacuum to those pucks 30 of the first and second pluralities of pucks 30a, 30b that the second vacuum source 74b is in fluid communication with. The vacuum controller 76 is further configured to cease (deactivate) the generation of vacuum by the first vacuum source 74a and by the second vacuum source 74b. As shown in the example illustrated in FIG. 1, the vacuum controller 76 includes a processor 92 and a memory component 94. The vacuum controller 76 is in operable communication with the first vacuum source 74a, the second vacuum source 74b, the first compressed air source 90a, the second compressed air source 90b and each vacuum check valve 72. The vacuum controller 76 is configured to receive from each vacuum check valve 72 the data indicative of the vacuum in the suction cup 70 associated with the vacuum check valve 72.

The vacuum controller 76 may be further configured to determine whether the vacuum in the suction cup 70 is greater than or equal to a threshold or if the vacuum in the suction cup 70 is less than a threshold. The vacuum controller 76 may be further configured to close the vacuum check valve 72 if the vacuum in the suction cup 70 associated with the vacuum check valve 72 is greater than or equal to a threshold. The vacuum controller 76 may be further configured to cease the generation of vacuum by a vacuum source 74*a*, 74*b* if each vacuum check valve 72 in fluid communication with the vacuum source 74*a*, 74*b* has been closed.

The processor 92 may be a microcontroller, a digital signal processor (DSP), an electronic control module (ECM), an electronic control unit (ECU), a microprocessor or any other suitable processor 92 as known in the art. The processor 92 may execute instructions and generate control signals for activating or ceasing the generation of vacuum by the first and second vacuum sources 74*a*, 74*b*, and for determining whether the data received from the vacuum check valve 72 is indicative of a vacuum level in the section cup 70 that is greater than or equal to a threshold, or less than a threshold. Such instructions may be read into or incorporated into a computer readable medium, such as the memory component 94 or provided external to the processor 92. In alternative examples, hard wired circuitry may be used in place of, or in combination with, software instructions to implement a control method.

The term "computer readable medium" as used herein refers to any non-transitory medium or combination of media that participates in providing instructions to the processor 92 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other computer readable medium.

The vacuum controller 76 is not limited to one processor 92 and memory component 94. The vacuum controller 76 may include several processors 92 and memory components 94. In an example, the processors 92 may be parallel processors that have access to a shared memory component(s) 94. In another example, the processors 92 may be part of a distributed computing system in which a processor 92 (and its associated memory component 94) may be located remotely from one or more other processor(s) 92 (and associated memory components 94) that are part of the distributed computing system. The vacuum controller 76 may also be configured to retrieve from the memory component 94 and formulas and other data necessary for determinations/calculations discussed herein.

Figure 7:
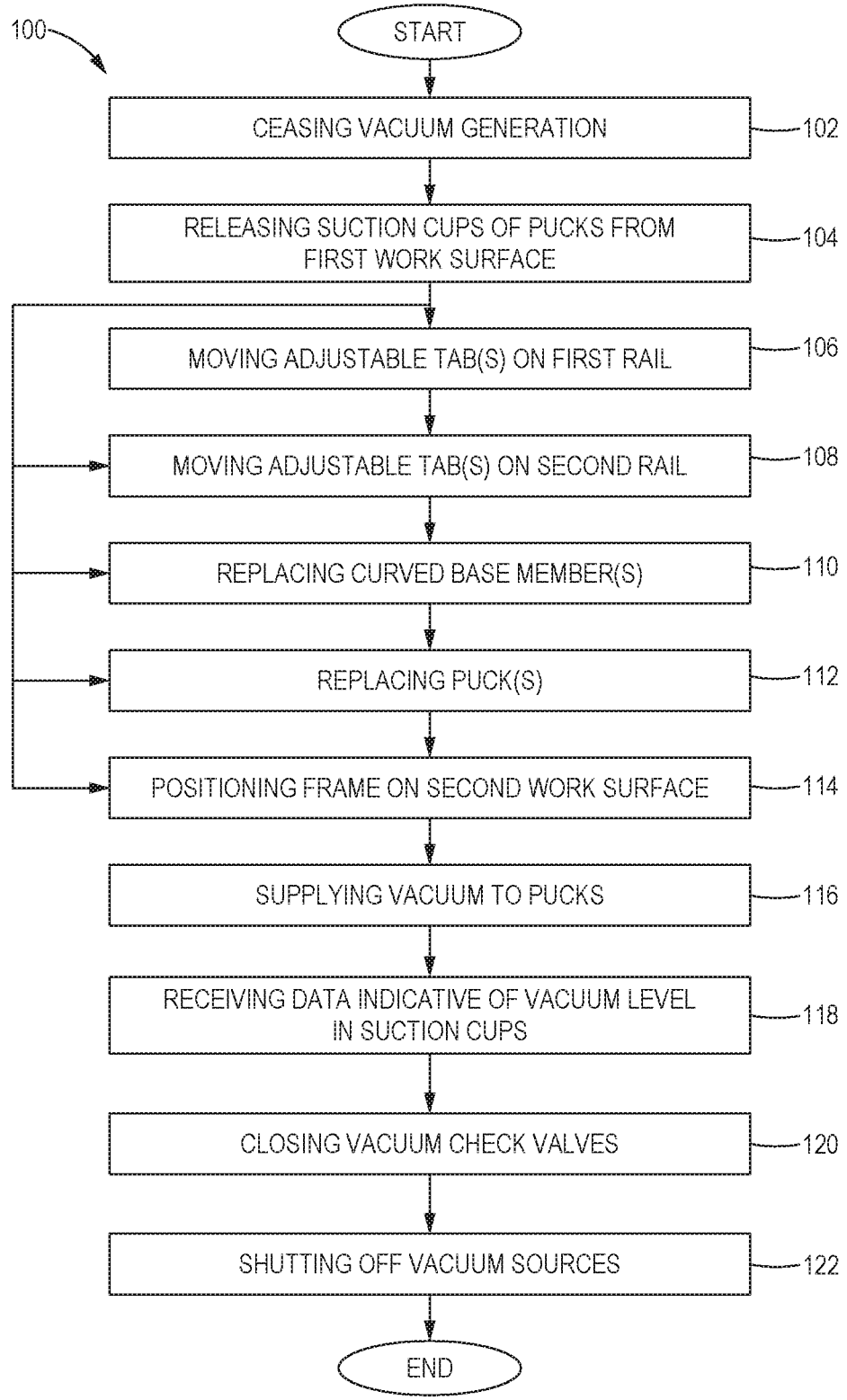
FIG. 7 illustrates an example of a method of repositioning a frame of a multi-axis gantry system, in accordance with an example of the present disclosure.

Referring now to FIG. 7, an exemplary flowchart is illustrated showing sample blocks which may be followed for repositioning a frame 16 of a multi-axis gantry system 10 from a first work surface 18*a* to a second work surface 18*b*. The method 100 may be practiced with more or less than the number of blocks shown and is not limited to the order shown.

While, the aspects of the method 100 will be explained throughout the disclosure and with reference to FIGS. 1-7, the method 100 includes: ceasing, by the vacuum controller 76, vacuum supplied to the first plurality of pucks 30*a* disposed on the first work surface 18*a* and vacuum supplied to the second plurality of pucks 30*b* disposed on the first work surface 18*a* until each puck 30*a*, 30*b* in the first and second pluralities of pucks 30*a*, 30*b* is releaseable from the first work surface 18*a*; reconfiguring the frame 16 from a first configuration 20*a* to a second configuration 20*b*; positioning the frame 16 on a second work surface 18*b*; and supplying, by the vacuum controller 76, vacuum to the first plurality of pucks 30*a* disposed on the second work surface 18*b* and to the second plurality of pucks 30*b* disposed on the second work surface 18*b* to secure each puck 30*a*, 30*b* in the first and second pluralities of pucks 30*a*, 30*b* to the second work surface 18*b*.

At block 102, if any of the one or more vacuum sources 74*a*, 74*b* are generating vacuum, ceasing, by the vacuum controller 76, generation of such vacuum supplied to the first plurality of pucks 30*a* disposed on the first work surface 18*a* and/or to the second plurality of pucks 30*b* disposed on the first work surface 18*a*.

At block 104, releasing from the first work surface 18*a* the first plurality of pucks 30*a* and the second plurality of pucks 30*b*. In an example, the releasing may include reducing the vacuum seal of each suction cup 70 in the first plurality of pucks 30*a* and in the second plurality of pucks 30*b* by opening the vacuum check valve 72 associated with each such suction cup 70 to release the vacuum from the suction cup 70. In an example, the opening of the vacuum check valves 72 may be activated by the vacuum controller 76. A lanyard 78 coupled to the frame 16 and also coupled to the lift 86 may be utilized to hold the frame 16 once released from the first work surface 18*a*.

At block 106, the method 100 may include reconfiguring the frame 16 by releasing a first adjustable tab 58 from the first vacuum attachment point 48*a*1 and moving the first adjustable tab 58 from the first vacuum attachment point 48*a*1 (of the first plurality of vacuum attachment points 48*a*) to the second vacuum attachment point 48*a*2 of the first plurality of vacuum attachment points 48*a* on the first rail 24*a* (compare for example the frame 16 shown in FIG. 2 to that of FIG. 4) and securing the first adjustable tab 58 to the second vacuum attachment point 48*a*2 (e.g., via bolts, screws or the like through the one or more apertures 52 of the second vacuum attachment point 48*a*2). In one example, the first puck 30*a*1 of the first plurality of pucks 30*a* coupled to the first adjustable tab 58 (see FIG. 2) is moved (together with the first adjustable tab 58) from the first vacuum attachment point 48*a*1 of the first plurality of vacuum attachment points 48*a* to the second vacuum attachment point 48*a*2 (see FIG. 4) of the first plurality of vacuum attachment points 48*a* on the first rail 24*a*. Such moving may occur prior to the positioning of the frame 16 on the second work surface 18*b*.

At block 108, the method 100 may include reconfiguring the frame 16 by releasing a second adjustable tab 58 from the first vacuum attachment point 48*b*1 of the second plurality of vacuum attachment points 48*b* and moving the second adjustable tab 58 from the first vacuum attachment point 48*b*1 of the second plurality of vacuum attachment points 48*b* to a second vacuum attachment point 48*b*2 of the second plurality of vacuum attachment points 48*b* on the second rail 24*b* (compare for example the frame 16 shown in FIG. 2 to that of FIG. 4) and securing the second adjustable tab 58 to the second vacuum attachment point 48*b*2 (e.g., via bolts, screws or the like through the one or more apertures 52 of the second vacuum attachment point 48*b*2). In one example, the first puck 30*b*1 (see FIG. 2) of the second plurality of pucks 30*b* is coupled to the second adjustable tab 58 (not visible in FIG. 2) and is moved together with the second adjustable tab 58 from the first vacuum attachment point 48b1 of the second plurality of vacuum attachment points 48b to the second vacuum attachment point 48b2 (see FIG. 4) of the second plurality of vacuum attachment points 48b on the second rail 24b. Such moving may occur prior to the positioning of the frame 16 on the second work surface 18b.

At block 110, the method 100 may include reconfiguring the frame 16 by replacing one or more of the first plurality of curved base members 22a that each have a first curve profile with one or more of a second plurality of curved base members 22b that each have a second curve profile. The second curve profile may be different than the first curve profile (compare, for example, the frame 16 shown in FIG. 2 that includes the first plurality of curved base members 22a to the frame 16 shown in FIG. 3 that includes the second plurality of curved base members 22b).

At block 112, the method 100 may include reconfiguring the frame 16 by replacing the first plurality of pucks 30a that have a first puck profile with a third plurality of pucks 30c that each have a second puck profile and/or replacing the second plurality of pucks 30b that each have a first puck profile with a fourth plurality of pucks 30d that each have a second puck profile. The second puck profile may be different than the first puck profile. In one example, the second puck profile may have a greater height than the first puck profile (compare, for example, the exemplary frame 16 shown in FIG. 2 that includes a first plurality of pucks 30a and a second plurality of pucks 30b that each have a first puck profile to the exemplary frame 16 shown in FIG. 5 that includes a third plurality of pucks 30c and a fourth plurality of pucks 30d that each have a second puck profile).

At block 114, the method 100 includes positioning the frame 16 (more specifically, the first and second pluralities of pucks 30a, 30b) on the second work surface 18b. In one example, the frame 16 may be positioned on the second work surface 18b so as to be oriented in a generally horizontal position as shown in FIG. 6. In another example, the frame 16 may be positioned on the second work surface 18b so as to be oriented in a generally vertical position. In yet another example, the frame 16 may be positioned on the second work surface 18b so as to be oriented at an angle to a horizontal plane or a vertical plane. As shown in FIG. 6, the lanyard 78 coupled to the frame 16 and also coupled to a lift 86 may be utilized to hold/support the frame 16 for positioning on the second work surface 18b.

At block 116, the method 100 includes supplying vacuum to the first plurality of pucks 30a disposed on the second work surface 18b and to the second plurality of pucks 30b disposed on the second work surface 18b. In an example, supplying the vacuum may include activating a flow of compressed air from a first compressed air source 90a to the first vacuum source 74a, and activating another flow of compressed air from a second compressed air source 90b to the second vacuum source 74b. Such activation may be by the vacuum controller 76. In one example, the supplying may include gradually increasing the level of vacuum provided to the suction cups 70 of the first plurality of pucks 30a disposed on the second work surface 18b and to the suction cups 70 of the second plurality of pucks 30b until the suction cup 70 of each puck 30a, 30b in the first and second pluralities is secured (by a vacuum seal) to the second work surface 18b. In the example illustrated in FIG. 1, the first vacuum source 74a is in fluid communication with the suction cup 70 of a first puck 30a1 of the first plurality of pucks 30a and in fluid communication with the suction cups 70 of the second puck 30b2 and third puck 30b3 of the second plurality of pucks 30b. Similarly, the second vacuum source 74b is in fluid communication with the suction cup 70 of the first puck 30b1 of the second plurality of pucks 30b and in fluid communication with the suction cups 70 of the second puck 30a2 and third puck 30a3 of the first plurality of pucks 30a. The arrangement of this example provides for two triangles of suction support of the frame 16. Should one of the first vacuum source 74a or second vacuum source 74b malfunction, only one of the suction triangles would be effected and support may still be provided by the other suction triangle to hold the frame 16 in place.

At block 118, the method 100 may include receiving by the vacuum controller 76 from the each vacuum check valve 72 of the first plurality of pucks 30a and the second plurality of pucks 30b, data indicative of the vacuum level in the suction cup 70 associated with each such vacuum check valve 72.

At block 120, the method 100 may include, for each suction cup 70 for which the vacuum level in the suction cup 70 is at least a threshold value, closing by the vacuum controller 76, the vacuum check valve 72 associated with such suction cup 70 in order to maintain the vacuum level in the respective suction cup 70.

At block 122, once the vacuum check valve 72 is closed for each puck 30a, 30b in fluid communication with the first vacuum source 74a, the method 100 may include shutting off the first vacuum source 74a by the vacuum controller 76, and once the vacuum check valve 72 is closed for each puck 30a, 30b in fluid communication with the second vacuum source 74b, shutting off the second vacuum source 74b by the vacuum controller 76. This optional step may be beneficial for vacuum sources 74a, 74b such as vacuum ejectors to help minimize the compressed air consumption of the vacuum ejector.

INDUSTRIAL APPLICABILITY

In general, the foregoing disclosure finds utility in applications relating to the printing, engraving, cutting or laser ablation applications performed on complex work surfaces 18. In particular, use of the teachings herein provide for a multi-axis gantry system 10 for positioning an end effector 64, for example, a print head, to work with a high degree of accuracy on work surfaces 18 that are complex (or simple), small and/or located between surface protrusions, attachments or changes in elevations (on the surface).

The multi-axis gantry apparatus 12 disclosed herein is portable and reconfigurable, which increases the range of surfaces to which it can be secured and on which it can be used. The plurality and arrangement of pucks 30a, 30b secure the multi-axis gantry apparatus 12 to the work surface 18 and provide continued distributed support in the event that a vacuum leak is detected. Furthermore, the suction cups 70 allow the frame 16 and the end effector 64 to be positioned at any orientation on a work surface 18. For example when utilized with a work surface 18 of the fuselage of a plane, the frame 16 and end effector 64 may be positioned on top of the fuselage, on the side, underneath or at any point around the circumference of the fuselage. When utilized with an end effector 64 that is a print head, this allows for greater accuracy than conventional gantries and less print overlap when printing continuous designs on the fuselage. Furthermore, if part of the frame 16 (e.g., the curved base members 22, first rail 24a, second rail 24b, or pucks 30a, 30b) becomes damaged over time, such part can easily be replaced according to the teachings of the present disclosure with minimal disruption to production.

While the preceding text sets forth a detailed description of numerous different examples, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A multi-axis gantry apparatus comprising:
    a frame in a first configuration for mounting to a first work surface, the frame comprising:
        a first plurality of curved base members;
        a first rail and a second rail oriented parallel to the first rail, each of the first rail and second rail releasably coupled to the plurality of curved base members, the first rail including a first plurality of vacuum attachment points and the second rail including a second plurality of vacuum attachment points, each vacuum attachment point in the first plurality and in the second plurality comprising an aperture pattern;
        a bridge disposed between the first rail and the second rail, the bridge slidably moveable along the first rail and the second rail;
        a carriage slidably moveable along the bridge, the carriage including an end effector;
        a first plurality of pucks releasably coupled to the first rail, wherein a first puck of the first plurality of pucks is disposed on a first vacuum attachment point of the first plurality of vacuum attachment points, the first puck repositionable to a second vacuum attachment point of the first plurality of vacuum attachment points on the first rail; and
        a second plurality of pucks releasably coupled to the second rail, wherein a first puck in the second plurality of pucks is disposed on a first vacuum attachment point of the second plurality of vacuum attachment points and is repositionable to a second vacuum attachment point of the second plurality of vacuum attachment points on the second rail,
        wherein the frame is reconfigurable to a second configuration mountable on a second work surface that is different from the first work surface, wherein in the second configuration the first puck in the first plurality of pucks is disposed on the second vacuum attachment point of the first rail.

2. The multi-axis gantry apparatus of claim 1, wherein each of the first plurality of curved base members has a first curve profile, wherein further the first plurality of curved base members are replaceable in the frame with a second plurality of curved base members, each of the second plurality of curved base members having a second curve profile that is different than the first curve profile.

3. The multi-axis gantry apparatus of claim 1, in which the first plurality of pucks further includes a second puck and a third puck, the first puck disposed between the second and third pucks.

4. The multi-axis gantry apparatus of claim 3, in which the second plurality of pucks further includes a second puck and a third puck, the first puck of the second plurality of pucks disposed between the second puck and third puck of the second plurality.

5. The multi-axis gantry apparatus of claim 1, in which each puck in the first plurality of pucks includes a suction cup configured to receive the first work surface and a vacuum check valve configured to capture data indicative of a vacuum level.

6. The multi-axis gantry apparatus of claim 1, wherein each of the pucks in the first plurality of pucks has a first puck profile, wherein further the first plurality of pucks are replaceable on the frame with a third plurality of pucks that each have a second puck profile, the second puck profile different than the first puck profile.

7. The multi-axis gantry apparatus of claim 1, wherein in the second configuration the first puck in the second plurality of pucks is disposed on the second vacuum attachment point of the second rail.

8. The multi-axis gantry apparatus of claim 1, wherein the first and second rails extend in a first direction and the carriage is slidably moveable along the bridge in a second direction, the second direction transverse to the first direction.

9. A method for repositioning a frame of a multi-axis gantry system from a first work surface to a second work surface, the multi-axis gantry system including the frame and a vacuum system, the frame comprising a first plurality of curved base members, a first rail and a second rail oriented parallel to the first rail, each of the first rail and second rail releasably coupled to the plurality of curved base members, the first rail including a first plurality of vacuum attachment points and the second rail including a second plurality of vacuum attachment points, each vacuum attachment point comprising an aperture pattern, a bridge disposed between the first rail and the second rail, the bridge slidably moveable along the first rail and the second rail, a carriage slidably moveable along the bridge, the carriage including an end effector, a first plurality of pucks releasably coupled to the first rail, wherein a first puck of the first plurality of pucks is disposed on a first vacuum attachment point on the first rail, the first puck repositionable to a second vacuum attachment point on the first rail, and a second plurality of pucks releasably coupled to the second rail, wherein a first puck in the second plurality of pucks is disposed on a first vacuum attachment point on the second rail and is repositionable to a second vacuum attachment point on the second rail, wherein the frame is reconfigurable to a second configuration that is mountable on a second work surface that is different from the first work surface, wherein, in the second configuration, the first puck in the first plurality of pucks is disposed on the second vacuum attachment point on the first rail, the vacuum system including a vacuum controller, a first vacuum source and a second vacuum source, the vacuum controller configured to activate or deactivate the generation of vacuum by the first vacuum source and the second vacuum source, the first vacuum source in fluid communication with at least one puck of the first plurality of pucks and at least one puck of the second plurality of pucks, the second vacuum source in fluid communication with at least one puck of the first plurality of pucks and at least one puck of the second plurality of pucks, the method comprising:
- ceasing, by the vacuum controller, vacuum supplied to the first plurality of pucks disposed on the first work surface and to the second plurality of pucks disposed on the first work surface until each puck in the first and second pluralities of pucks is releaseable from the first work surface;
- reconfiguring the frame from a first configuration to a second configuration;
- positioning the frame on a second work surface; and
- supplying, by the vacuum controller, vacuum to the first plurality of pucks disposed on the second work surface and to the second plurality of pucks disposed on the second work surface to secure each puck in the first and second pluralities of pucks to the second work surface.

10. The method of claim 9, in which the reconfiguring includes moving the first puck of the first plurality of pucks from the first vacuum attachment point of the first plurality of vacuum attachment points to the second vacuum attachment point of the first plurality of vacuum attachment points on the first rail.

11. The method of claim 10, in which the reconfiguring includes replacing the first plurality of curved base members with a second plurality of curved base members, the first plurality having a first curve profile, and the second plurality having a second curve profile.

12. The method of claim 9, wherein the end effector is a print head.

13. The method of claim 9 wherein each of the first plurality of pucks has a first puck profile,
- in which the reconfiguring includes replacing the first plurality of pucks with a third plurality of pucks, each of the third plurality of pucks having a second puck profile that is different from the first puck profile.

14. A multi-axis gantry system comprising:
- a frame in a first configuration for mounting to a first work surface, the frame comprising:
  - a first plurality of curved base members;
  - a first rail and a second rail, the second rail oriented parallel to the first rail, each of the first rail and the second rail releasably coupled to the plurality of curved base members, the first rail including a first plurality of vacuum attachment points and the second rail including a second plurality of vacuum attachment points, each vacuum attachment point in the first plurality and in the second plurality comprising an aperture pattern;
  - a bridge disposed between and coupled to the first rail and the second rail, the bridge further disposed between the plurality of curved base members, the bridge slidably moveable along the first rail and the second rail;
  - a carriage slidably moveable along the bridge, the carriage including an end effector;
  - a first plurality of pucks releasably coupled to the first rail, wherein a first puck of the first plurality of pucks is disposed on a first vacuum attachment point of the first plurality of vacuum attachment points and is repositionable to a second vacuum attachment point of the first plurality of vacuum attachment points on the first rail, each puck in the first plurality of pucks including a suction cup configured to receive the first work surface or a second work surface and a vacuum check valve in fluid communication with the suction cup, the vacuum check valve configured to capture data indicative of a vacuum level; and
  - a second plurality of pucks releasably coupled to the second rail, wherein a first puck in the second plurality of pucks is disposed on a first vacuum attachment point of the second plurality of vacuum attachment points and is repositionable to a second vacuum attachment point of the second plurality of vacuum attachment points on the second rail, each puck in the second plurality of pucks including a suction cup and a vacuum check valve in fluid communication with the suction cup, the vacuum check valve configured to capture data indicative of a vacuum level,
- wherein the frame is reconfigurable to a second configuration mountable on the second work surface that is different from the first work surface, wherein in the second configuration the first puck in the first plurality of pucks is disposed on the second vacuum attachment point of the first rail; and
- a vacuum system comprising:
  - a vacuum controller configured to activate or deactivate the generation of vacuum by a first vacuum source and a second vacuum source;
  - the first vacuum source in fluid communication with at least one puck of the first plurality of pucks and at least one puck of the second plurality of pucks; and
  - the second vacuum source in fluid communication with at least one puck of the first plurality of pucks and at least one puck of the second plurality of pucks.

15. The multi-axis gantry system of claim 14,
- in which the first plurality of pucks further includes a second puck and a third puck, wherein the first puck of the first plurality of pucks is disposed between the second and third pucks of the first plurality of pucks; and
- in which the second plurality of pucks further includes a second puck and a third puck, the first puck of the second plurality of pucks disposed between the second puck and third puck of the second plurality.

16. The multi-axis gantry system of claim 15,
- wherein the first vacuum source is in fluid communication with the second puck and the third puck of the second plurality of pucks; and
- wherein the second vacuum source is in fluid communication with the second puck and the third puck of the first plurality of pucks.

17. The multi-axis gantry system of claim 14, in which the frame includes a first adjustable tab coupled to the first puck of the first plurality of pucks, the first adjustable tab releasably coupled to the first rail at the first vacuum attachment point, wherein when released from coupling at the first vacuum attachment point, the first adjustable tab is slidably moveable to the second vacuum attachment point of the first rail.

18. The multi-axis gantry system of claim 14, wherein the first and second rails extend in a first direction and the carriage is slidably moveable along the bridge in a second direction, the second direction transverse to the first direction.

19. The multi-axis gantry system of claim 18, in which the carriage further comprises a tower slidingly coupled to the end effector, the end effector slidably moveable along the tower in a third direction, the third direction transverse to the first direction and to the second direction.

20. The multi-axis gantry system of claim 19, wherein the end effector is a print head configured to print on the first work surface.

* * * * *